United States Patent [19]

Blizzard

[11] Patent Number: 5,213,617
[45] Date of Patent: May 25, 1993

[54] PRIMER FOR SILICONE SUBSTRATES

[75] Inventor: John D. Blizzard, Bay County, Mich.

[73] Assignee: Dow Corning Corporation, Midland, Mich.

[21] Appl. No.: 714,811

[22] Filed: Jun. 13, 1991

[51] Int. Cl.$^5$ .............................................. C08K 5/54
[52] U.S. Cl. ........................... 106/287.13; 106/287.14; 106/287.15; 106/243
[58] Field of Search ............. 106/287.13, 287.14, 106/287.15, 287.16, 287.19, 243

[56] References Cited

U.S. PATENT DOCUMENTS

| | | | |
|---|---|---|---|
| 3,619,256 | 11/1971 | Pepe et al. | 117/75 |
| 3,663,282 | 5/1972 | Smith | 106/287.19 |
| 3,671,483 | 6/1972 | Young | 260/32.8 |
| 3,677,998 | 7/1972 | Young | 260/33.6 |
| 4,122,127 | 10/1978 | Mikami et al. | 260/825 |
| 4,133,938 | 1/1979 | Bingham | 428/447 |
| 4,147,685 | 4/1979 | Smith, Jr. | 260/31.2 R |
| 4,287,114 | 9/1981 | Itoh et al. | 524/493 |
| 4,332,844 | 6/1982 | Hamada et al. | 427/387 |
| 4,401,500 | 8/1983 | Hamada et al. | 156/307.5 |
| 4,431,472 | 2/1984 | Hohl et al. | 156/307.3 |
| 4,436,787 | 3/1984 | Mikami et al. | 428/447 |
| 4,534,815 | 8/1985 | Hamada et al. | 156/307.5 |
| 4,546,018 | 10/1985 | Ryuzo et al. | 427/407.2 |
| 4,598,134 | 7/1986 | Hirai et al. | 528/17 |
| 4,654,236 | 3/1987 | Finzel | 427/409 |
| 4,681,636 | 7/1987 | Saito et al. | 106/287.15 |
| 4,690,713 | 9/1987 | Terae et al. | 106/287.16 |
| 4,704,419 | 11/1987 | Fukayama et al. | 524/188 |
| 4,719,262 | 1/1988 | Plueddemann | 525/100 |
| 4,749,741 | 6/1988 | Saito et al. | 524/859 |
| 4,808,483 | 2/1989 | Nakasuji et al. | 428/447 |
| 4,846,886 | 7/1989 | Fey et al. | 106/2 |
| 4,900,362 | 2/1990 | Fujiki et al. | 106/287.19 |
| 4,923,946 | 5/1990 | Meddaugh | 528/18 |

FOREIGN PATENT DOCUMENTS 59-48768  3/1984  Japan .

*Primary Examiner*—David Brunsman
*Attorney, Agent, or Firm*—Alexander Weitz

[57] ABSTRACT

A primer composition, and a method for its use to improve adhesion between a silicone substrate and a subsequently applied paint film, is disclosed. The primer composition consists essentially of a mixture of an alkoxysilane, an organotitanate and a tin salt of a carboxylic acid, each component being present in a specific critical molar proportion.

14 Claims, No Drawings

PRIMER FOR SILICONE SUBSTRATES

FIELD OF THE INVENTION

The present invention relates to a primer composition for silicone substrates and a method for its use to improve adhesion between the primed substrate and a subsequently applied overcoat or paint film. More particularly, the invention relates to a primer composition consisting essentially of a mixture of an alkoxysilane, an organotitanate and a tin salt of a carboxylic acid, each component being present in a specific critical proportion.

BACKGROUND OF THE INVENTION

Various substrates, such as metals, glass and plastics, require the application of a primer before they can be coated with a conventional paint or other coating formulation. Such primer compositions have often relied on one or more organosilane compounds to promote the adhesion between substrate and coating. Thus, for example, Finzel, in U.S. Pat. No. 4,654,236, teaches a method for priming coil coated substrates with a solution of a tetraorganosilane and a tetraalkyltitanate. The primed surfaces can be subsequently painted to provide surfaces which are as durable as the original coil coatings. Similar organosilanes can also be employed in various compositions for purposes other than priming substrates. For example, U.S. Pat. No. 4,846,886 to Fey et al. discloses compositions wherein an improved water repellent composition for porous substrates is formed from an alkylalkoxysilane, a carrier, a water beading agent and a metal salt catalyst.

Of concern herein is the particular difficulty of painting or overcoating a silicone substrate. This operation is particularly troublesome since silicone and silicone polymer substrates characteristically exhibit very low surface energies. They are thus better known in the art for their abhesive nature and typically tend to release most coating compositions applied thereto. Since it is often desirable to paint or otherwise overcoat a silicone substrate (e.g., for decorative purposes. abrasion/erosion resistance, printing, marking) many attempts have been made over the years to develop satisfactory primers for this application. The following disclosures represent the relevant art of this type known to applicant.

Young, in U.S. Pat. No. 3,671,483, discovered that a solution containing a tetraalkyltitanate and a particular silane which has at least one group of the formula —CH$_2$CH$_2$—Si(OOCCH$_3$)$_3$ in its molecule is useful as a primer in adhering a silicone rubber to epoxy and polyurethane.

In U.S. Pat. No. 3,677,998, Young also teaches that a solution of an organotitanate, tetra(methoxyethoxy)silane, a methylsiloxane resin and either acetic acid or an organotriacetoxysilane is useful as a primer in adhering a silicone rubber to a metal surface.

Hirai et al., in U.S. Pat. No. 4,598,134, teach a primer composition for heat curable silicone rubber consisting essentially of at least one epoxy-functional organosilicon compound, a trialkoxysilane having either two silicon-bonded hydrogens or two unsaturated groups or a partial hydrolyzate of said trialkoxysilane, and an organotitanate ester.

Saito et al., in U.S. Pat. No. 4,681,636 disclose a primer composition particularly suitable for bonding fluorosilicone rubber to a substrate. This primer comprises a solution of a t-butyl peroxy-functional silane, a reactive organosilicon compound having at least two alkoxy groups and an organotitanate ester. In another disclosure to Saito et al., U.S. Pat. No. 4,749,741, primers suitable for promoting adhesion between silicone rubber and plastics or metals are taught. These primers are similar to their previous systems and comprise a solution of an unsaturated organotitanate ester and either an organosilicon compound having at least two alkoxy groups or an organohydrogensiloxane (or silane).

In U.S. Pat. No. 4,704,419, Fukayama et al. teach primer compositions which improve adhesion of paints to cured silicone rubber and comprise a solution of an amine-functional dialkoxysilane and a liquid hydroxyl terminated polyorganosiloxane, optionally further comprising a catalyst.

Meddaugh, in U.S. Pat. No. 4,923,946, discloses a primer for moisture-cured silicone sealants which imparts paintable surfaces thereto. The primers disclosed contain a solution of a hydrolyzate of an aminoalkyl-substituted trialkoxysilane and a carboxylic acid salt of tin.

A method for bonding to a silicone rubber is disclosed in Japanese Kokai Patent No. 59[1984]-48768 to Toray Industries, Inc. Here, a waterless lithographic plate having a photosensitive layer, an adhesive layer and a silicone rubber layer is described wherein the adhesive layer contains an organic titanate. Printing plates of this invention are stated have a strong adhesion between the photosensitive layer and the silicone rubber layer.

In addition to the above described art, the following United States patents teach various primer compositions which promote adhesion to silicone surfaces: 4,431,472 to Hohl et al., 4,122,127 to Mikami et al., 4,534,815 to Hamada et al., 4,546,018 to Ryuzo et al., 4,133,938 to Bingham, 4,147,685 to Smith, 4,332,844 to Hamada et al., 3,619,256 to Pepe et al., 4,808,483 to Nakasuji et al., 4,436,787 to Mikami et al. and 4,401,500 to Hamada et al.

SUMMARY OF THE INVENTION

It has now been found that certain blends of an alkoxysilane, an organotitanate and a tin salt of a carboxylic acid can act as a superior primer composition for certain silicone substrates which are subsequently to be overcoated or painted with a silicone or organic composition, thereby providing greatly improved adhesion between the silicone substrate and the overcoat film. Surprisingly, it has been observed that this marked improvement in adhesion is obtained only when the above named components are present in the critical molar ratios described infra. Thus, for example, a preferred water repellant composition disclosed by Fey et al., cited supra, consists of 85 weight percent isobutyltrimethoxysilane, 10 weight % tetraisopropyltitanate and 5 weight % dibutyltindilaurate. This composition, although similar to the primers of the instant invention, is not within the critical range discovered by applicant and has not been found to be an effective primer for silicone substrates. More to the point, Fey et al. do not suggest the use of their water repellant compositions as primers for silicone substrates. It is thus the discovery of the use of such narrowly defined compositions to prime certain silicone substrates, and the discovery of the apparently synergistic range of the necessary ingredients, which is at the heart of the present invention.

The instant invention therefore relates to a primer composition consisting essentially of a mixture of (I) from 25 to 75 mole percent of at least one alkoxysilane having the general formula $$R_xSi(OR')_{4-x}$$

wherein R is a monovalent organic moiety selected from the group consisting of an alkyl group having 1 to 6 carbon atoms, an allyl radical, a vinyl radical, an epoxy-functional organic group and an acryl-functional organic group. R' is an alkyl radical having 1 to 3 carbon atoms and x is an integer having a value of 1 to 3 inclusive; (II) from 13 to 60 mole percent of an organotitanate having the formula $$Ti(OR'')_4$$

wherein R'' is an alkyl radical having 1 to 8 carbon atoms; and (III) from 12 to 60 mole percent of a tin salt of a carboxylic acid having 2 to 18 carbon atoms.

The present invention further relates to a method for overcoating a silicone substrate with a paint comprising first coating said silicone substrate with the above described primer, thereby forming a primed silicone substrate, and then overcoating said primed silicone substrate with said paint.

DETAILED DESCRIPTION OF THE INVENTION

Component (I) of the primer compositions of the present invention is an alkoxysilane, or a mixture of alkoxysilanes, each alkoxysilane having the general formula $$R_xSi(OR')_{4-x}$$

wherein R is a monovalent organic moiety independently selected from the group consisting of an alkyl group having 1 to 6 carbon atoms, an allyl radical, a vinyl radical, an epoxy-functional organic group and an acryl-functional organic group, R' is an alkyl radical having 1 to 3 carbon atoms and x is an integer having a value of 1 to 3 inclusive. It is preferred that component (I) is a trialkoxysilane (i.e., x=1), most preferably a trimethoxysilane.

For the purposes of the present invention, when R is the above mentioned epoxy-functional organic group, it is attached to the silicon atom by a silicon-carbon bond, the organic portion acting only as a connecting group between the epoxy functionality and the silicon atom of the silane. The nature of the connecting group is thus not critical as long as it contains no more than about 6 carbon atoms and it contains no other functionality which is reactive with components (II) and (III) of the invention, described infra. As will be apparent to the skilled artisan, this connecting group must also not adversely affect the method of the present invention wherein a paint or other coating is applied to a silicone substrate primed with the compositions of the invention. Examples of suitable connecting groups include alkylene groups, such as trimethylene, tetramethylene and hexamethylene, and oxygen-linked alkylene groups, such as oxypropylene and oxybutylene. Specific epoxy-functional alkoxysilanes include glycidoxypropyldimethylmethoxysilane and glycidoxypropylmethyl-di-isopropoxysilane. A particularly preferred epoxy-functional alkoxysilane of the invention is gamma-glycidoxypropyltrimethoxysilane.

Similarly, when R is the above mentioned acryl-functional organic group, it is attached to the silicon atom through a silicon-carbon bond wherein the nature of the organic connecting group is again not critical as long as it contains no more than about 6 carbon atoms and does not contain any functionality which can react adversely with the other components of the compositions and method of the instant invention. Thus, the connecting groups described above for the epoxy-functional organic group are also suitable in the acryl-functional silanes. As used herein, the term "acryl" refers to a moiety having the structure $$CH_2=C(Q)C(O)O-$$

in which Q is selected from the group consisting of hydrogen and an alkyl radical having 1 to 6 carbon atoms. Preferred alkoxysilanes having such acryl functionality include acryloxypropyltrimethoxysilane and methacryloxypropyltrimethoxysilane.

Specific examples of other alkoxysilanes which are suitable for use as component (I) include methyltrimethoxysilane, vinyltrimethoxysilane, allyltrimethoxysilane, butyltrimethoxysilane, hexyltrimethoxysilane, vinyltriethoxysilane, allyltriethoxysilane, methyltriethoxysilane, dimethyldimethoxysilane, methylvinyldimethoxysilane and methylallyldimethoxysilane.

Component (II) of the present invention is an organotitanate having the formula $$Ti(OR'')_4$$

wherein R'' is an independently selected alkyl radical having 1 to carbon atoms. Specific examples of suitable organotitanates include tetrabutyl titanate, tetraisopropyl titanate, tetramethyl titanate, ethylmethyldibutyl titanate, tetraoctyl titanate and tetraethylhexyl titanate. In preparing the primer compositions of the present invention, it is preferred that component (II) is either tetra(n-)butyl titanate or tetraisopropyl titanate.

Surprisingly, it has been found that chelated organotitanates, such as titanium isopropoxybis(acetylacetonate), result in the formation of undesirable precipitates when mixed with components (II) and (III), described infra. Therefore, even though such titanium compounds have been successfully employed in various primer compositions of the prior art, they are not within the scope of the present invention.

Component (III) of the present invention is a tin (II) or tin (IV) salt of at least one carboxylic acid having 2 to 18 carbon atoms, the remaining valences of the tin being satisfied by a moiety selected from the group consisting of alkyl radicals having 1 to 4 carbon atoms and a phenyl radical. Examples of suitable tin (IV) compounds include dibutyltin diacetate, dibutyltin dilaurate and tin tripropyl acetate. Examples of tin (II) compounds include stannous octoate, stannous oxalate, stannous caprylate, stannous 2-ethylhexoate, stannous naphthanate, stannous oleate, stannous palmitate and stannous stearate.

The above described components (I), (II) and (III) of the present invention are well known in the art, many of them being commercially available, and no further description thereof is considered necessary to enable one of ordinary skill in the art to practice the invention.

In order to prepare the primer compositions of the present invention, from about 25 to about 75 mole percent of component (1), from about 13 to about 60 mole percent of component (II) and from about 12 to about 60 mole percent of component (III) are thoroughly blended to form a homogeneous dispersion or solution. It has been found that primer compositions outside these critical ranges have a significantly reduced ability to promote adhesion between a silicone substrate coated with the primer composition and a subsequently applied paint or overcoat layer. In highly preferred embodiments, the relative molar percentages of components (I), (II) and (III) are 48 to 65, 20 to 36 and 15 to 31, respectively.

Although the above described primer composition can be applied (i.e., coated) directly to a silicone substrate at 100% solids, it is preferred to dilute the composition with one or more organic solvents in order to reduce application viscosity and limit the thickness of the primer coat. Examples of suitable solvents for this purpose are hexane, heptane, toluene, xylene, mineral spirits and cyclic siloxanes, heptane being preferred. When a solvent or solvent mixture is employed, it is preferred that from about 0.5 to about 10 weight percent of the above described primer composition is thoroughly dispersed therein.

In addition to the solvent, it is contemplated that the primer compositions of the present invention can further comprise minor portions (e.g., up to about 5 parts by weight per 100 parts by weight of said component I, II and III) of dyes, pigments, flow additive, and the like.

In order to use the above described primer composition according to the method of the present invention, the primer composition may first be applied to a silicone substrate by the usual techniques practiced in the art, such as dip coating, spray painting, knife coating, brush coating, inter alia. As used herein, the term "silicone substrate" is intended to encompass both silicone homopolymer compositions and organic-silicone copolymer compositions and includes such substrates as silicone rubbers, silicone sealants, silicone resins, silicone-alkyd copolymer compositions, silicone-epoxy copolymer compositions, silicone-urethane copolymer compositions, and the like. However, it has been observed that not all types of silicone substrates can be effectively primed with the compositions of the invention. A preferred silicone substrate which may be primed with the instant compositions to illustrate the unexpectedly superior performance thereof is a cured product based on silicone systems taught in U.S. Pat. No. 4,537,829 to Blizzard et al., which patent is assigned to the assignee of the present invention and is hereby incorporated by reference. Briefly stated, these curable compositions comprise a blend of (A) from 1 to 200 parts by weight of a liquid organosilicon resin, (B) 100 parts by weight of a vinyl or hydroxyl-functional organosilicon polymer, (C) from 1 to 50 parts by weight of a vinylated organosilicon resin and (D) from 0.00003 to 0.035 parts by weight of a hydrosilylation catalyst. The above named component (A) is a reaction product of (i) an organosilicon resin consisting essentially of triorganosiloxy units and $SiO_2$ units in a molar ratio of 0.6 to 0.9 and (ii) a polyorganohydrogensiloxane. Component (B) is an organosilicon polymer having the formula

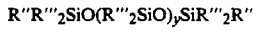

wherein each $R'''$ is selected from the group consisting of monovalent hydrocarbon radicals, each $R''$ is selected from the group consisting of OH radicals and $R'''$ radicals, y has a value of 0 to 5000, there being on average at least two radicals of the organosilicon polymer selected from the group consisting of vinyl radicals and hydroxyl radicals. Component (C) in the above composition is an organosilicon resin consisting essentially of $Me_2(CH_2=CH)SiO_{\frac{1}{2}}$, $Me_3SiO_{\frac{1}{2}}$ units and $SiO_{4/2}$ units in a molar ratio of 0.1:0.6:1 to 0.25:0.9:1. respectively, wherein Me hereinafter denotes a methyl radical.

Another preferred silicone substrate is a cured elastomer based on a high molecular weight vinyl-functional silicone gum (e.g., one having a viscosity of at least about $10^4$ Poise at 25° C.) which contains from about 10 to about 40 parts by weight of a silica filler having a surface area between about 50 and 300 $m^2/g$. These materials are well known in the art, are available commercially and are generally cured with the aid of a peroxide catalyst.

After the primer has dried on the silicone substrate for about 15 minutes to about 24 hours and essentially all of the dilution solvent has evaporated therefrom, the primed silicone substrate is overcoated or painted with a conventional coating or paint composition. The latter material may be selected from organic or silicone systems or compositions based on copolymers thereof. Thus, for example, the overcoat may comprise a formulated silicone resin paint, an alkyd paint, a polyurethane paint or a silicone-alkyd paint, among others. After the paint or coating has been applied and dried and/or cured onto the primed silicone substrate, an improved degree of adhesion between the paint or coating and the silicone substrate is obtained. A paint which derives a particular advantage in this manner is one based on a silicone-alkyd copolymer and has been effectively employed as a maintenance coating for naval vessels, wherein durability and good adhesion to the overcoated substrate is critical. Other paints or coatings can be based on, e.g., polyimide or epoxy polymers.

EXAMPLES

The following examples are presented to further illustrate the primer compositions and method of the invention, but are not to be construed as limiting the invention, which is delineated in the appended claims. All parts and percentages in the examples are on a weight basis and all measurements were obtained at 25° C., unless indicated to the contrary.

The following materials, listed alphabetically for ease of reference, were employed in the examples:

ATMS = Allyltrimethoxysilane.
DBTDA = dibutyltin diacetate.
DBTDL = dibutyltin dilaurate.
IBTMS = isobutyltrimethoxysilane.
MTMS = methyltrimethoxysilane.
TBT = tetra(n-)butyl titanate.
TPT = tetraisopropyl titanate.
VTMS = vinyltrimethoxysilane.
Z-6020 = An alkoxysilane consisting essentially of N-(beta-aminoethyl)-gamma-aminopropyltrimethoxysilane; marketed by the Dow Corning Corp., Midland, Mich.
Z-6030 = An alkoxysilane consisting essentially of gamma-methacryloxypropyltrimethoxysilane; marketed by the Dow Corning Corp.
Z-6040 = An alkoxysilane consisting essentially of gamma-glycidoxypropyltrimethoxysilane; marketed by the Dow Corning Corp.

EXAMPLES 1-25

Primer compositions of the invention and comparative compositions were prepared by thoroughly mixing the components (I), (II) and (III) shown in Table 1 in the molar ratios indicated. Each primer composition was diluted with heptane to provide an approximately 10 weight percent dispersion therein, the following being exceptions: the compositions of Examples 9-11 and 15 as well as (Comparative) Examples 22-24 were diluted to form 4% dispersions in heptane and Examples 13-14 were diluted to form 12% dispersions in heptane.

A curable silicone rubber coating formulation was prepared by thoroughly mixing equal weights of the following two components according to the teachings of above cited U.S. Pat. No. 4,537,829 to Blizzard et al. The first component consisted of a mixture of 82 weight percent of a dimethylvinylsiloxy endblocked polydimethylsiloxane having a viscosity of about 3 Pa's and 18 weight percent of a benzene soluble resin copolymer of triorganosiloxy units and $SiO_2$ units in the molar ratio of about 0.7 mole of triorganosiloxy units per mole of $SiO_2$ units where the triorganosiloxy units were trimethylsiloxy units and dimethylvinylsiloxy units and the resin copolymer contained about 2 weight percent silicon-bonded vinyl radicals. The second component of the silicone coating composition was a blend of 91.3 weight percent of a liquid organosilicon resin as shown in Example 1 of U.S. Pat. No. 4,537,829 (at column 8, lines 23-44), 0.5 weight percent of 3.5 dimethyl-1-hexyn-3-ol and 8.2 weight percent of a mixture of methylvinylcyclosiloxanes.

The above curable silicone rubber mixture was catalyzed with a platinum complex hydrosilation catalyst (53 ppm platinum based on the weight of the total coating mixture). The catalyzed system was coated onto steel panels and cured thereon at room temperature for at least 24 hours.

Heptane dispersions of the primer composition described in Table 1 were wiped onto the panels coated with the cured silicone rubber using a cheesecloth applicator and the resulting film was allowed to air dry for about 30 minutes. At this point, the primed panels were overcoated with a flat grey silicone-alkyd paint obtained from Seagrave Coatings Corp. of Virginia (Portsmouth. Va.). This paint, described as product number TT-E-490, is said to meet Military Specification Mil-C-83286B. After being painted in this manner, each panel was again allowed to dry, this time for about 72 hours, before being tested.

Bonding of the paint to the primed silicone rubber was evaluated by a standard ASTM D-3359 crosshatch adhesion test. Briefly stated, this procedure consists of scribing a square grid onto the coated substrate with a special cutter, applying an adhesive tape to the scribed area and peeling the tape off. The adhesive tape tends to pull off the coating and the amount of the scribed coating remaining is an indication of the integrity of its bond to the substrate beneath. For the purposes herein, the following rating scheme was used:

| Rating | Percent of Scribed Surface Removed By Tape |
|--------|--------------------------------------------|
| 0 | ~100 (i.e., essentially no adhesion) |
| 1 | ~80 |
| 2 | ~60 |
| 3 | ~40 |
| 4 | ~20 |
| 5 | ~0 (i.e., approximately 100 adhesion) |

The results of these adhesion tests are presented in Table 1, from which it can be seen that primer compositions not within the critical range of components (I), (II) and (III) of the present invention had ratings of no more than 3+ (corresponding to about 35% of paint removed by tape) while the primers of the invention all had ratings of at least 4- (corresponding to about 25% of paint removed by tape). It is further noteworthy that the aforementioned composition of Fey et al. (expressed in molar ratios in Comparative Example 25), had an adhesion rating of only 2.

TABLE 1

| Example | Component (I) | Component (II) | Component (III) | Mole Ratio of Components (I):(II):(III) | Adhesion Rating |
|---------|---------------|----------------|-----------------|------------------------------------------|-----------------|
| 1 | ATMS | TBT | DBTDA | 52:24:24 | 5 |
| 2 | " | " | " | 58:24:18 | 4+ |
| 3 | " | " | " | 42:39:19 | 4- |
| 4 | " | " | " | 41:30:29 | 4+ |
| 5 | " | " | " | 41:20:39 | 4+ |
| 6 | " | " | " | 27:60:13 | 4+ |
| 7 | " | " | " | 29:36:35 | 4 |
| 8 | " | " | " | 27:13:60 | 4 |
| 9 | " | " | DBTDL | 57:28:15 | 5 |
| 10 | " | TPT | " | 55:31:14 | 4 |
| 11 | " | " | DBTDA | 49:28:23 | 5 |
| 12 | Z-6030 | TBT | " | 41:30:29 | 4 |
| 13 | MTMS | " | " | 56:22:22 | 5 |
| 14 | Z-6040 | " | " | 42:29:29 | 4 |
| 15 | VTMS | TPT | DBTDL | 57:30:13 | 4 |

(Comparative) Example

| | Component (I) | Component (II) | Component (III) | Mole Ratio of Components (I):(II):(III) | Adhesion Rating |
|---|---|---|---|---|---|
| 16 | ATMS | TBT | DBTDA | 83:9:8 | 3 |
| 17 | " | " | " | 92:5:3 | 3 |
| 18 | " | " | " | 60:29:11 | 3+ |
| 19 | " | " | " | 61:11:28 | 3 |
| 20 | " | " | " | 76:12:12 | 2-3 |
| 21 | Z-6020 | " | " | 44:28:28 | 1* |
| 22 | VTMS | — | — | 100:0:0 | 1 |
| 23 | — | — | DBTDA | 0:0:100 | 1 |
| 24 | — | TBT | — | 0:100:0 | 2 |
| 25 | IBTMS | TPT | DBTDA | 92:6:2 | 2 |

TABLE 1-continued

| | Primer Mixture | | | Mole Ratio | |
|---|---|---|---|---|---|
| | Component (I) | Component (II) | Component (III) | of Components (I):(II):(III) | Adhesion Rating |
| Control | — | — | — | — | 0 |

*Formed a precipitate.

EXAMPLE 26

In a procedure similar to that described for Examples 1-25, a 100% solids primer was prepared (i.e., one containing no solvent) having a mole ratio of ATMS:TBT:DBTDA of 52:24:24. This primer was applied to the silicone rubber substrate, as described above, allowed to air dry for 15 minutes and then coated with the TT-E 490 Navy Grey paint. This coating was air dried for seven days. An adhesion rating of 5 resulted.

COMPARATIVE EXAMPLE 27

A primer mixture consisting of ATMS, titanium acetylacetonate and DBTDA in a molar ratio of 52:24:24 was diluted to form a 12% dispersion in heptane. The titanium acetylacetonate used was an isopropyl alcohol chelate obtained from E. I. du Pont (Wilmington, Del.) under the trade name of TYZOR TM TAA. This primer composition formed a precipitate and could not be readily applied to the silicone rubber substrate.

EXAMPLE 28

The above procedures were repeated wherein a peroxide-cured silicone rubber, based on a copolymer of a polydimethylsiloxane gum having about 0.14 mole percent of methylvinylsiloxane units and filled with about 31 weight percent of a pyrogenic silica having an approximate surface area of 255 m²/g, was wiped with a primer having the composition shown in Example 1 (diluted to a 11.9% dispersion in heptane). After drying for about 30 minutes, the primed silicone rubber was overcoated with the above described TT-E 490 and with a commercial spray paint (KRYLO TM Crystal Clear 1301 acrylic; Borden Inc., Columbus, Ohio). Upon further drying, these coated substrates were subjected to the crosshatch adhesion test and resulted in ratings of 5 in each case. Similarly painted unprimed controls using this rubber substrate each had an adhesion rating of 0.

COMPARATIVE EXAMPLES 29-30

The experiment of Example 28 was repeated using two room temperature vulcanizing (RTV) silicone compositions, each of which was based on a vinyl-terminated polydimethylsiloxane liquid, methylvinylcyclopolysiloxane and a polyfunctional SiH-functional crosslinker. The first of these RTVs was filled with about 12.4 weight percent of a pyrogenic silica having a surface area of about 255 m²/g while the second RTV contained about 38 weight percent of a mixture of 65 percent by weight of dimethylvinylsiloxy endblocked polydimethylsiloxane oil and 35 percent by weight of a benzene soluble resin copolymer of triorganosiloxy units and SiO₂ units having a ratio of about 0.7 mole of triorganosiloxy unit per mole of SiO₂ unit where the triorganosiloxy units are trimethylsiloxy units and dimethylvinylsiloxy units and the resin copolymer has about 2 weight percent silicon-bonded vinyl radicals. Each of these RTV compositions was catalyzed with platinum, coated onto a steel panel and cured.

A primer having the composition shown in Example 1 was applied to each of the above cured silicone RTV substrates, dried for 30 minutes and overcoated with the TT-E 490 and the KRYLO TM paints. After the paints were dried for 72 hours, each crosshatch adhesion test resulted in a rating of 3 for the case of the first silicone RTV substrate and a rating of 0 for the second silicone RTV substrate. The unprimed controls gave ratings of 0 in each instance. This series of experiments indicates that the unique adhesion promoting character of the instant primer compositions is not of universal utility for all silicone substrates. Rather, it is specific to at least the types of silicone surfaces illustrated in Examples 1-15, 26 and 28.

I claim:
1. A primer composition consisting essentially of a mixture of
    (I) from 25 to 75 mole percent of at least one alkoxysilane having the general formula

    $$R_xSi(OR')_{4-x}$$

wherein R is a monovalent organic moiety selected from the group consisting of an alkyl group having 1 to 6 carbon atoms, an allyl radical, a vinyl radical, an epoxy functional organic group and an acryl-functional organic group, R' is an alkyl radical having 1 to 3 carbon atoms and x is an integer having a value of 1 to 3 inclusive;
    (II) from 13 to 60 mole percent of an organotitanate having the formula

    $$Ti(OR'')_4$$

wherein R'' is an alkyl radical having 1 to 8 carbon atoms; and (III) from 12 to 60 mole percent of a tin salt of a carboxylic acid having 2 to 18 carbon atoms.
2. The composition according to claim 1, wherein x of said alkoxysilane (I) is 1.
3. The composition according to claim 2, wherein R' of said alkoxysilane (I) is a methyl radical.
4. The composition according to claim 3, wherein said alkoxysilane (I) is selected from the group consisting of allyltrimethoxysilane, vinyltrimethoxysilane, methyl trimethoxysilane, gamma-glycidoxypropyltrimethoxysilane, acryloxypropyltrimethoxysilane and methacryloxypropyltrimethoxysilane.
5. The composition according to claim 4, wherein said organotitanate (II) is selected from the group consisting of tetrabutyl titanate and tetraisopropyl titanate.
6. The composition according to claim 5, wherein said tin salt (III) is selected from the group consisting of dibutyltin diacetate and dibutyltin dilaurate.
7. The composition according to claim 6, wherein said alkoxysilane (I) is allyltrimethoxysilane and the molar percentages of said alkoxysilane (I), said organotitanate (II) and said tin salt (III) are 48 to 65, 20 to 36 and 15 to 31, respectively.

8. A primer composition consisting essentially of:
(i) a mixture of
(I) from 25 to 75 mole percent of at least one alkoxysilane having the general formula $R_xSi(OR')_{4-x}$ wherein R is a monovalent organic moiety selected from the group consisting of an alkyl group having 1 to 6 carbon atoms, an allyl radical, a vinyl radical, an epoxy-functional organic group and an acryl-functional organic group, R' is an alkyl radical having 1 to 3 carbon atoms and x is an integer having a value of 1 to 3 inclusive;
(II) from 13 to 60 mole percent of an organotitanate having the formula $Ri(OR'')_4$ wherein R" is an alkyl radical having 1 to 8 carbon atoms; and (III) from 12 to 60 mole percent of a tin salt of a carboxylic acid having 2 to 18 carbon atoms, and
(ii) from 90 to 99.5 weight percent of an organic solvent based on the weight of said mixture (i).

9. The composition according to claim 8, wherein x of said alkoxysilane (I) is 1.

10. The composition according to claim 9, wherein R' of said alkoxysilane (I) is a methyl radical.

11. The composition according to claim 10, wherein said alkoxysilane (I) is selected from the group consisting of allyltrimethoxysilane, vinyltrimethoxysilane, methyl trimethoxysilane, gamma-glycidoxypropyltrimethoxysilane, acryloxypropyltrimethoxysilane and methacryloxypropyltrimethoxysilane.

12. The composition according to claim 11, wherein said organotitanate (II) is selected from the group consisting of tetrabutyl titanate and tetraisopropyl titanate.

13. The composition according to claim 12, wherein said tin salt (III) is selected from the group consisting of dibutyltin diacetate and dibutyltin dilaurate.

14. The composition according to claim 13, wherein said alkoxysilane (I) is allyltrimethoxysilane and the molar percentages of said alkoxysilane (I), said organotitanate (II) and said tin salt (III) in said mixture (i) are 48 to 65, 20 to 36 and to 31, respectively.

* * * * *